United States Patent [19]

Klein

[11] 4,209,918
[45] Jul. 1, 1980

[54] COMBINE GRAIN DRYING APPARATUS

[76] Inventor: Darrel J. Klein, R.R. 2, Box 10, Breckenridge, Minn. 56520

[21] Appl. No.: 43,127

[22] Filed: May 29, 1979

[51] Int. Cl.² .............................................. F26B 17/22
[52] U.S. Cl. ...................................... 34/182; 34/86; 34/228; 56/12.2; 34/90
[58] Field of Search .................. 34/86, 90, 179, 178, 34/181, 182, 203, 205, 228, 232, 236; 56/12.2

[56] References Cited

U.S. PATENT DOCUMENTS

| | | | |
|---|---|---|---|
| 1,658,775 | 10/1927 | Campbell | 34/86 X |
| 2,200,379 | 4/1938 | Williams | 34/86 X |
| 2,465,070 | 10/1947 | Demuth | 56/12.2 |
| 2,706,371 | 9/1951 | Bishop | 56/16.5 |
| 2,777,212 | 11/1954 | McOmber | 34/86 |
| 3,016,626 | 1/1962 | Kompus | 34/182 |
| 3,096,165 | 9/1962 | Lane | 34/86 X |
| 3,527,031 | 3/1967 | Winger | 56/12.2 X |
| 3,581,407 | 1/1968 | Ward et al. | 56/12.2 X |
| 3,755,918 | 9/1973 | Parrot | 34/236 |
| 3,931,683 | 1/1976 | Crites et al. | 34/86 X |
| 4,010,552 | 3/1977 | Peteson | 34/182 X |
| 4,021,929 | 4/1975 | Black | 56/12.2 X |
| 4,144,655 | 3/1979 | Harris | 34/236 |

FOREIGN PATENT DOCUMENTS 2725839 12/1978 Fed. Rep. of Germany ............. 34/181

Primary Examiner—Ronald C. Capossela
Assistant Examiner—Harold Joyce
Attorney, Agent, or Firm—Robert C. Baker

[57] ABSTRACT

The disclosed grain harvesting machine has a grain threshing mechanisn, a storage hopper into which grain from the threshing mechanism is transported for temporary storage, and an apparatus for drying the grain while in the storage hopper. The drying apparatus comprises a grain collecting system, a grain drying column, and plenum means for feeding air into the column and system. The grain collecting system is mounted substantially horizontally in the storage hopper proximate to the bottom thereof. It has an outlet and conduit means extending from perimeter portions of the storage hopper to the outlet. The conduit means has inlet openings along its upper portions for entry of grain mechanism by gravity and has grain transport means therewithin for moving grain therethrough to the outlet. The grain drying column is mounted at the outlet of the collecting system and extends upwardly from the outlet. The column has an elevated exit port for discharge of grain therefrom back into the hopper. Within the column is a grain transport means for elevating grain from the outlet of the collecting system to the exit port of the column. Heated air is forced into the drying column and also into the collecting system; and a plenum is employed for this purpose. The heated air removes moisture from the grain.

12 Claims, 5 Drawing Figures

COMBINE GRAIN DRYING APPARATUS

This invention relates to a grain harvesting or combine machine, and particularly to such a machine equipped with apparatus for drying freshly harvested grain in the storage hopper of the machine.

The grain drying teachings of this invention can be used to reduce the moisture content of freshly harvested grain to a range which contributes to a relatively stable bacteriological condition for the grain or to at least a reduced likelihood of bacteriological growth in the grain. Grain of such reduced moisture content is of greater value in the marketplace, especially when the moisture reduction is accomplished with no significant contamination of the grain. Reduction of the moisture content in grain also decreases the probability of hot spot formations during subsequent storage of the grain and therefore reduces the hazard of fire.

Others have proposed apparatus for drying grain while it is in the storage hopper of a combine, but no one insofar as is known has provided the art with a highly efficient recirculation and substantially non-contaminating means for accomplishing drying within the hopper. Many have suggested the use of exhaust gases for drying, but no one insofar as is known has coupled the use of exhaust heat with radiator heat to effect substantially non-contaminating drying by air flow through recirculated grain in the hopper. Many have suggested percolating heated gas through grain in a hopper, but no one insofar as is known has provided the art with a positive action collecting and elevating system for recirculating grain to accomplish non-contaminating drying of it in the hopper.

According to this invention, there is provided a grain harvesting machine having a grain threshing mechanism, a storage hopper into which grain from the threshing mechanism is transported for temporary storage, and an apparatus for drying the grain while it is in the storage hopper. The drying apparatus comprises a grain collecting system, a grain drying column, and plenum means for feeding air into the column.

The grain collecting system is mounted substantially horizontally in the storage hopper proximate to the bottom thereof. This system has an outlet and conduit means extending from perimeter portions of the storage hopper to the outlet. The conduit means has inlet openings along the upper portions thereof for entry of grain thereinto by gravity and also has grain transport means therewithin for moving grain therethrough to the outlet.

The grain drying column is mounted at the outlet of the collecting system and extends upwardly from the outlet. This column has an elevated exit port for discharge of grain therefrom and has therewithin a grain transport means for elevating grain from the outlet of the collecting system to the exit port of the column.

The plenum means serves to feed heated air into the drying column, to thereby subject grain passing through the drying column to the removal of moisture therefrom by the heated air.

The preferred or most ideal plenum comprises an elongated chamber circumferentially surrounding a substantial portion of the grain drying column. Further, the portion of the grain drying column surrounded by the plenum chamber contains apertures through the wall of the column for the passage of heated air from the plenum chamber into the column. Other features discussed hereinbelow are also highly preferred. They considerably enhance the drying action, that is, the reduction of moisture content, without significant contamination of the grain. Especially desirable are the systems, discussed hereinbelow, for heating ambient air for use in drying.

Still further benefits and advantages of the invention will be described by reference to a drawing, made a part hereof, wherein.

Figure 1:
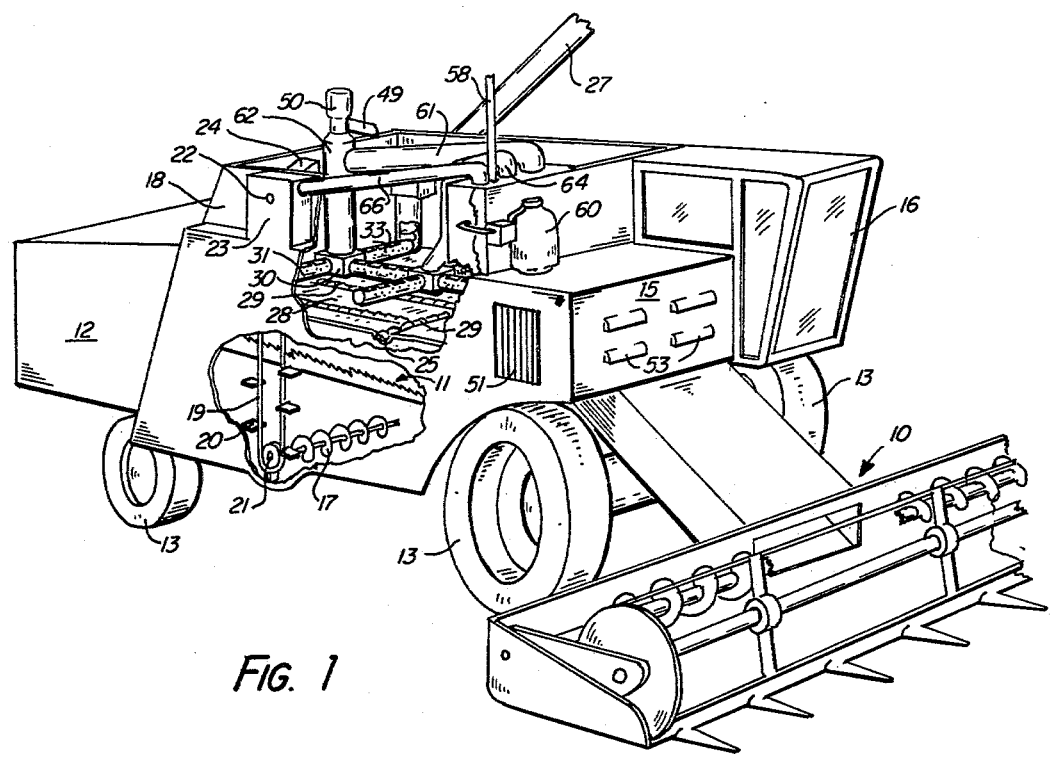
FIG. 1 is an overall schematic perspective view of combine harvesting machine equipped with the drying apparatus of this invention; parts are broken away to illustrate some internal features.

Referring to the drawing, some basic features of the grain harvesting machine, all well known, will first be described. The machine has attached to its front end an assembly 10 for gathering, severing from the ground, and feeding into its threshing mechanism 11, the crop to be harvested. The threshing mechanism 11 separates the grain from the crop and conveys the chaff or stalks out the rear 12 of the harvesting machine onto the ground (or optionally into a collector). Machines of this type are commonly referred to as combines. They are employed for the harvesting and threshing of a variety of crops. "Grain" is used generically herein, and refers to the seeds or kernels of such crops as oats, wheat, barley, maize or corn, soybeans and others. There are a variety of farm crops requiring separation of the grain from the stalk by a threshing operation. The "grain" sometimes may be in the form of ears, as in the case of maize or corn. The combine may or may not remove the grain from ears or clumps; but it at least removes the grain, in the form of ears of it, from the stalk of the crop.

The combine is self-propelled and thus is equipped with appropriate wheels 13 for movement as well as an internal combustion engine 14 (see FIGS. 2 and 3) within an engine compartment 15. An enclosed cab 16 is suitably provided for the operator of the combine.

The grain, after being threshed in the threshing mechanism 11, is moved to an elevator by any suitable means such as an auger assembly 17 on the threshing floor. It is then conveyed into a storage hopper 18 by any suitable conveyor means. For example, an endless chain 19 of buckets or paddles 20 may operate between pulleys on axis shafts 21 and 22. Any suitable housing 23 or conduit may be employed for the endless chain elevator. From an endless chain elevator, the grain may be dumped directly into the hopper 18, or it may be dumped into a recess from which it is conveyed into the hopper 18 by a screw conveyor or the like within an arm conduit elevator 24. Conveying the grain from the threshing floor into the hopper 18 may be accomplished in a variety of ways through any suitable conduit housing or housings.

Grain is retained within the storage hopper 18 as a temporary measure until the storage hopper 18 is substantially filled by the threshing operation. It is then removed therefrom, generally with continuous movement of the combine machine, by a system of grain transporting means or augers 25 in the floor structure of the hopper 18 in combination with an elevating transporting means 26 (see FIG. 3) for moving the grain up to and then through an unloading conduit 27. Any suitable transporting system may be employed to move the grain through the elevator 26 and the unloading conduit 27. Augers are useful. Over portions of the augers 25 in the hopper floor are suitably contoured floor panels 28 which allow grain to slide or fall by gravity through elongated openings 29 into underlying floor recesses where the unloading augers 25 operate for moving the grain to the unloading elevator 26. Generally, a truck is driven under the end of the unloading conduit 27 during the unloading operation, as is well understood in the art of continuous combining. These elements just discussed are all well known.

Figure 2:
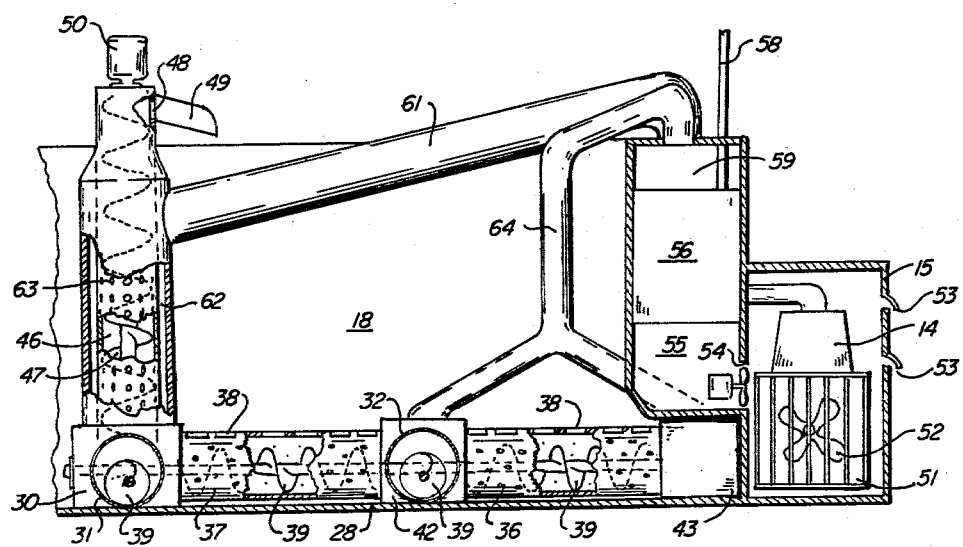
FIG. 2 is a highly schematic cross sectional view, for the most part taken approximagely on line 2—2 of FIG. 3, of the grain drying apparatus of this invention as located in the storage hopper of a combine harvesting machine; the view shows some parts broken away and includes a cross sectional schematic of the engine compartment of the combine.
Figure 3:
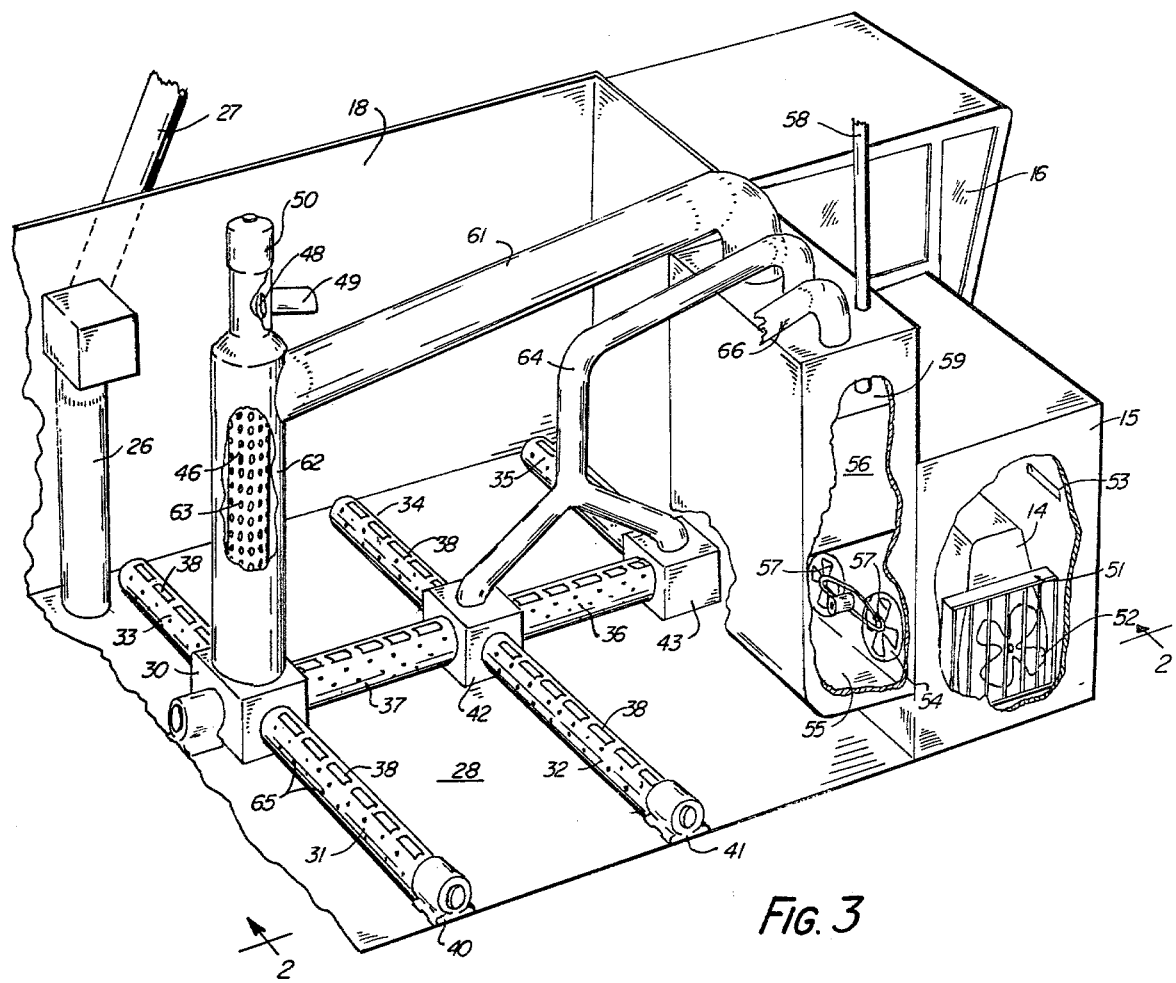
FIG. 3 is a schematic perspective view with parts broken away, of the grain drying apparatus of this invention within the storage hopper of the combine harvesting machine; the view includes a schematic of the of the engine compartment of the machine, with parts broken away.

Newly taught by this invention is a grain collecting system which is mounted as a substantially horizontal assembly proximate to the bottom of the storage hopper 18. This collecting system has a major outlet, which is illustrated in FIGS. 1, 2 and 3 as a box member 30. Extending from various perimeter portions or sidewall parts of the storage hopper 18 to the major outlet 30 of the collecting system is a conduit assembly 31 to 37, inclusive. A variety of conduit assemblies may be employed. In the illustrated system, the conduits are pipe-like in nature, but they could be trough-like. The illustrated assembly is that of a network, but a radial array from outlet 30 could be used. In any event, the conduits of the assembly must have inlet openings 38 along the upper portions thereof for entry of grain thereinto by gravity. The size of the inlet openings 38 should always be sufficiently large to allow the grain being harvested to fall therethrough. They normally should be for example at least about one inch square, or larger. They may be one inch wide slots extending the length of the conduits. Optionally, adjustment of the size of the inlets 38 may be desirable, and is easily made possible by employing a slide member mounted in channels on the conduit for sliding action to vary the size of the inlets 38.

Within the conduit means 31–37 are grain transport means or augers 39 (see FIG. 2) for moving grain through the conduits to the major outlet 30 of the collecting system. The augers may be rotated by any suitable system of gearing from a power source such as, for example, hydraulic motors 40 and 41. As particularly illustrated in FIG. 2, the augers are preferably mounted with their axis off center within conduits 31–37. They operate in the lower portions of the conduits to move the grain therein toward outlet 30. The augers in conduits 31 and 33 move the grain therein to and into outlet box 30 for the collection system. Augers in conduits 32 and 34 move the grain to and into a junction member or box 42; and the auger in conduit 35 moves the grain in it toward and into junction box 43.

Figure 4:
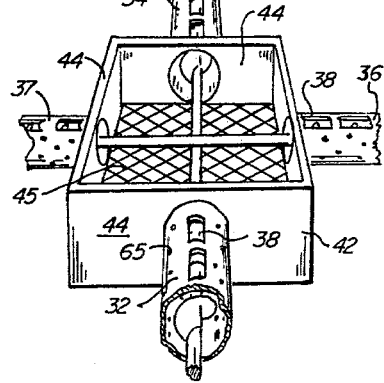
FIG. 4 is a schematic perspective view of a junction member or box suitably forming part of the collecting system of the drying apparatus of this invention.

Referring particularly to FIG. 4, the basic nature of the junction member 42 will be described. Junction member 43 and outlet member 30 are comparable in structure. These members have sidewalls 44 and an open floor or bottom which may optionally be covered with a screen 45 having openings at least large enough for the grain to fall therethrough. The reason the floor or bottom is open or non-walled is to allow grain to fall through it onto the floor of the hopper 18 and into the aforementioned system of augers 25 for unloading the hopper. During non-unloading times, the grain falls through the bottom of these members until a build up of grain occurs from the underlying inactive unloading system of the floor. Then further drop of the grain out of the box members 30, 42 and 43 ceases; and the junction member itself becomes filled with grain emptying into it from the conduits of the collecting system such as conduits 32, 34 and 36. The auger in conduit 36 moves accumulated grain from the junction member 43 into junction member 42. An auger in connecting conduit 37 moves accumulated grain from the junction 42 into outlet 30. Thus the conduit network, with junction members as necessary, collects at least some grain from several scattered portions near the floor of the hopper 18 and moves it into the outlet 30 of the collecting system.

Over the outlet member 30 is a grain drying column 46. It is mounted to extend upwardly from the outlet 30 as a vertical or substantially vertical conduit or tower. Within the drying column 46 is located a grain transport means such as a central auger 47 (see FIG. 2) for elevating grain from the outlet 30 of the collecting system to an elevated exit port 48 from the column. A spout 49 for the grain to slide down may extend from the exit port 48. The elevated exit port 48 allows grain drawn up the column to fall out of the column and back into the hopper 18. A hydraulic motor 50 suitably may be employed to rotate the auger means 47 for elevating the grain in the drying column.

It will be recognized that the collecting system in combination with the grain drying column 46, and the means 47 therewithin for elevating grain, provides an arrangement for continuously recirculating the grain in the hopper 18.

The system for exposing the grain in the hopper to the action of heated air to effect removal of moisture from the grain will now be described. It is emphasized that the air employed for drying of the grain is not exhaust contaminated. Ambient air from outside the combine is employed for the drying action. The air is drawn through the radiator 51 for cooling the internal combustion engine. Radiator 51 is located in a radiator opening of the engine compartment 15, or forms one wall of that compartment, as is well known. The fluid coolant heated by the engine passes through the radiator 51 for cooling action. As ambient air is pulled or drawn through the radiator 51 by the engine fan 52 (see FIG. 3) to cool the coolant for the engine, the heat removed from the coolant is picked up by the air. That air then goes into the compartment 15 surrounding the engine 14. Some of it may escape from the compartment 15 through vents 53 in the compartment sides. Much of it is drawn from the engine compartment 15 through an opening or connection link 54 between the engine compartment 15 and a chamber or inlet 55 for air into a heat exchange assembly 56. Fans 57 or other impeller means (see FIG. 3) are located at the interconnection 54 between the engine compartment 15 and the entry reservoir 55 for the heat exchange structure 56. The fans 57 function to move a substantial amount of the air from the engine compartment 15 into the entry reservoir 55 for the heat exchanger 56. Most of the air from the engine compartment is moved into the entry chamber 55 for the heat exchanger; optionally, some of the heated air in the engine compartment 15 escapes out slots 53 or other openings of the compartment. Any suitable means such as a hydraulic motor may be employed to drive the fans 57 to effect movement of the air from the engine compartment 15 toward the heat exchanger 56. Significantly, the air entering the heat exchanger 56 from the engine compartment has already been elevated in temperature by the radiator 51 for the engine as well as the external surfaces of the hot engine 14.

As the preheated air moves through the main heat exchanger 56, it is still further heated. Exhaust gases from the engine are directed transversely to the fresh ambient air flow through the heat exchanger 56. Any suitable heat exchanger arrangement may be employed to accomplish this result; and heat exchangers are well known and basically include means for conducting the flow of one fluid (e.g., exhaust gases) therethrough, means for conducting the flow of another fluid (e.g., ambient air) therethrough, and means separating the flow of each fluid so as to avoid contamination of one with the other. Exhaust gases from the engine suitably flow back and forth in finned conduits within the heat exchanger 56 and then out the exhaust pipe 58. Ambient air flows through the heat exchanger 56 from the entry chamber 55 to the manifold 59 above the heat exchanger 56.

Under some circumstances, even greater heating of the ambient air than provided by the systems just described may be desired. Optionally, such greater heating may be accomplished by passing the exhaust from a propane burner 60 (see FIG. 1) or some other auxiliary heat source through a portion of the heat exchanger 56, or through a separate heat exchanger through which the ambient air is passed on its way to the manifold 59. If an auxiliary burner of high efficiency is employed, with little or no contaminating exhaust, direct introduction of the exhaust from the burner may be made into the manifold to increase the temperature of the heated air therein. It is preferable, however, to avoid introduction of exhaust gases into the ambient heated air. Grain dried without introduction of contaminants is more valuable in the marketplace.

From the manifold 59, the ambient heated air passes through a conduit 61 to a plenum chamber 62 surrounding the grain drying column 46. A major portion of the heated air is passed in this conduit 61 to the plenum chamber 62. In essence, the plenum chamber 62 comprises an elongated chamber circumferentially surrounding a substantial portion, at least half or more, of the length of the grain drying column 46. There are apertures or openings 63 in the portion of the grain drying column 46 surrounded by the plenum chamber. The apertures 63 or other openings form the means in the walls of the grain drying column 46 for allowing the passage of heated air from the plenum chamber 62 into the interior of the drying column 46. Preferably, the apertures are of a size (e.g., up to about 1/16 inch width or diameter) not sufficiently large for the passage therethrough of the grain transported or elevated in the grain drying column. However, some apertures or openings sufficiently large to allow some grain to escape therethrough into the plenum chamber can sometimes be used. Where such larger openings are employed, it is important to open the area at the bottom of the plenum chamber 62 over the outlet structure 30 so as to allow the grain to fall into the outlet structure 30 from the plenum, for subsequent elevation in the drying column 46. Open access from the plenum into the outlet 30 is also desirable for the purpose of feeding a counterflow of air into the outlet 30 and from there into the collecting conduits 31, 33, 37.

Another conduit 64 (or conduits) extends from the manifold 59 to each of the junction boxes 42 and 43 employed in the collection system. Branched conduits may be employed. Significantly, the air forced into each junction box or member permeates the grain located therein and moves into the conduits extending laterally out from the junction member. For example, heated air from junction box 42 moves as a counterflow against the grain moving into the junction box 42 from conduits 32, 34 and 36, and as a flow with grain moving in conduit 37 away from junction box 42 to outlet member 30. While the larger openings on the upper portions of each of the collection conduits function as ports for entry of grain into the collection conduits, they also serve as openings through which heated air may pass and percolate through the grain in the storage hopper or bin 18. Additionally, however, it is desirable to employ a plurality of smaller openings 65 (see FIGS. 3 and 4) along the lateral sides of the conduits of the collection system so as to allow some air to escape outwardly in a lateral direction from them for percolating through the grain of the storage hopper. The lateral openings 65 are preferably not large enough for the grain being treated to pass therethrough.

A still further conduit 66 from the manifold may be employed to convey heated air to the conveyor means for transportation or elevating grain from the threshing mechanism 11 into the storage hopper 18. If desired, this conduit 66 may connect with conveyor means at an intermediate point (such as at the upper end of the elevating system 19, 20 and the lower end of the arm conduit 24), so that a portion of the heated air introduced into the conveyor means traverses in a counterflow downwardly toward the threshing mechanism and a portion traverses in a concurrent flow with the transport or elevation of the grain into the hopper 18.

If desired, dampers or air flow control elements may be placed within the heated air conduits from the manifold so as to regulate the quantity of air traveling through any particular air conduit and maintain maximum flow in the conduit 61 to the plenum chamber 62 for the drying column. Further, if desired, auxiliary air plenum units or fans may be placed at different locations in the air conduit system.

Figure 5:
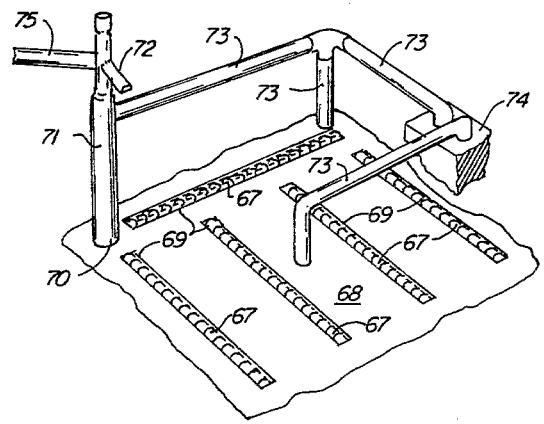
FIG. 5 is a schematic perspective view of an alternative embodiment of the drying apparatus of this invention.

As illustrated in FIG. 5, the existing auger system 67 in conduit recesses in the floor 68 of combine hoppers may be integrated or employed as the grain collecting system required for grain drying as taught by this invention. Those augers 67 are largely covered by the floor panels 68, but each operates within a conduit recess under the floor. Inlet openings 69 along the upper portions of the conduit recesses allow grain to fall into the conduit recesses, where augers 67 move it to a common outlet area 70 under the floor panels 68. A drying column and plenum 71, as aforedescribed, may then elevate and discharge grain, as from a spout 72, back into the hopper. Conduits 73 from manifold 74 feed heated ambient air to the plenum 71 for the drying column and to selected parts of the grain collecting system under the hopper floor 68. When the hopper becomes filled with harvested grain, a door or valve may shut the exit port of the drying column to prevent flow of grain down spout 72 back into the hopper. A further door or valve may open a port in the drying column for transporting grain out of the hopper through an unloading arm 75. If the embodiment of FIG. 5 is employed, it is desirable to add reduction gears, clutches and the like for operating the auger system in both the floor and the drying column at variable speeds as desired. The more rapid rotation normal for the unloading operation is unnecessary for the drying operation and would tend to hasten wear problems.

Still further modifications or equivalents for the teachings herein are possible without departing from the essential features of the invention, as particularly set forth in the appended claims.

That which is claimed is:

1. A grain harvesting machine having a grain threshing mechanism, a storage hopper into which grain from said threshing mechanism is transported for temporary storage, and an apparatus for drying the grain while in said storage hopper, wherein said apparatus comprises:
   A. a grain collecting system mounted substantially horizontally in said storage hopper proximate to the bottom thereof, said system having an outlet and conduit means extending from perimeter portions of said storage hopper to said outlet, said conduit means having inlet openings along the upper portions thereof for entry of grain thereinto by gravity and having grain transport means therewithin for moving grain therethrough to said outlet,
   B. a grain drying column mounted at said outlet of said collecting system and extending upwardly from said outlet, said column having an elevated exit port for discharge of grain therefrom and having therewithin a grain transport means for elevating grain from said outlet of said collecting system to said exit port of said column, and
   C. plenum means for feeding heated air into said drying column, to thereby subject grain passing through said drying column to the removal of moisture therefrom by said heated air.

2. The machine of claim 1 wherein said plenum means comprises an elongated chamber circumferentially surrounding a substantial portion of said drying column, and wherein the portion of said grain drying column surrounded by said chamber contains apertures through the wall of said column for the passage of heated air from said plenum chamber into said column.

3. The machine of claim 2 wherein said apertures are of a size not sufficiently large for the passage therethrough of the grain transported in said column.

4. The machine of claim 1 wherein said plenum means additionally functions for feeding heated air through said outlet of said collecting system into said conduit means thereof, to thereby subject grain within said conduit means to the removal of moisture therefrom by said heated air.

5. The machine of claim 1 wherein said apparatus additionally comprises means for feeding heated air into said conduit means of said collecting system at a location other than said outlet of said collecting system.

6. The machine of claim 5 wherein said conduit means of said collecting system is equipped with a plurality of apertures of a size permitting the escape of heated air therethrough for percolating upwardly through grain in said storage hopper, said size being not sufficiently large to allow the passage of grain therethrough.

7. The machine of claim 1 additionally having conveyor means for transporting grain from said threshing mechanism to said storage hopper, wherein said apparatus additionally comprises means for introducing heated air into said conveyor means for removal of moisture from grain while transported by said conveyor means.

8. The machine of claim 1 additionally having an internal combustion engine, wherein said apparatus additionally comprises:
   A. a heat exchanger consisting essentially of means for conducting the flow of exhaust gases from said engine therethrough, means for conducting the flow of ambient air originating from a source outside said machine therethrough, means separating said flow of exhaust gases from said flow of ambient air therethrough, entry means for feeding ambient air into said heat exchanger, and manifold means for receiving heated ambient air exiting from said heat exchanger, and
   B. conduit means for conveying said heated ambient air from said manifold means to said plenum means.

9. The machine of claim 8 additionally having an engine compartment within which said internal combustion engine is located, a radiator opening in said compartment, a radiator for engine cooling fluid positioned in said radiator opening, and a fan for drawing ambient air through said radiator into said engine compartment to cool the engine cooling fluid passing through said radiator, wherein said apparatus additionally comprises connecting means for the passage of ambient air from said engine compartment, at the temperature attained by it after passing through and being heated by said radiator and the exterior of said engine within said compartment, with said entry means for feeding ambient air into said heat exchanger.

10. The machine of claim 9 wherein said apparatus includes fan means within said connecting means for pulling said ambient air from said engine compartment and moving it through said heat exchanger.

11. The machine of claim 8 wherein said apparatus additionally comprises means for conveying heated ambient air from said manifold means into said conduit means of said collecting system at a location other than said outlet of said collecting system.

12. The machine of claim 8 additionally having conveyor means for transporting grain from said threshing mechanism to said storage hopper, wherein said apparatus additionally comprises means for introducing heated ambient air from said manifold means into said conveyor means for removal of moisture from grain while transported by said conveyor means.

* * * * *